(12) United States Patent
Nicolussi et al.

(10) Patent No.: US 7,045,981 B2
(45) Date of Patent: May 16, 2006

(54) OPTIMIZED LOCOMOTIVE TRACTION SYSTEM

(75) Inventors: Mark Louis Nicolussi, Erie, PA (US); Paul Robert Hokanson, Girard, PA (US); Ajith Kuttannair Kumar, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/156,399

(22) Filed: Jun. 20, 2005

(65) Prior Publication Data

US 2006/0022622 A1    Feb. 2, 2006

Related U.S. Application Data

(60) Provisional application No. 60/590,557, filed on Jul. 23, 2004.

(51) Int. Cl.
*B61C 3/00* (2006.01)

(52) U.S. Cl. .................................. 318/139; 105/26.05

(58) Field of Classification Search ........ 318/105–113, 318/139; 105/26.05, 35, 49, 59
See application file for complete search history.

(56) References Cited

U.S. PATENT DOCUMENTS 3,878,400 A * 4/1975 McSparran ................... 290/14
4,634,887 A * 1/1987 Balch et al. .................... 290/3
6,415,606 B1 * 7/2002 Bowman et al. .............. 60/608

* cited by examiner

*Primary Examiner*—Bentsu Ro
(74) *Attorney, Agent, or Firm*—Carl Rowold; Steven M. McHugh

(57) ABSTRACT

A high-altitude railroad locomotive adapted for more reliable operation at high altitudes, wherein the high-altitude railroad locomotive includes a semiconductor electric power control component, and wherein due to the high altitude the locomotive would be exposed to high levels of cosmic radiation tending to damage the semiconductor electric power control component is provided. The high-altitude locomotive includes electric power generation equipment, a plurality of traction motors mechanically connected to wheels supporting the high altitude locomotive and an electric power transmission system for transmitting electrical power from the electric power generation equipment to the plurality of traction motors. A DC bus is also included and electrically connected to the traction motors and a power controller for controlling the transmission of power over the DC bus, the traction motors having a second active motor volume, wherein the second active motor volume is larger than the first active motor volume to enable the DC bus voltage of the high-altitude locomotive to be reduced relative to the first DC bus voltage while generating a range of mechanical power sufficient to propel the locomotive at high altitudes, whereby the combined effects on the semiconductor electric power control component caused by the DC bus voltage of the high-altitude locomotive and by the cosmic radiation correspond to these effects on the semiconductor electric power control components of the low-altitude locomotive when operating at low altitudes to reduce the likelihood of failure of the semiconductor electric power control component of the high-altitude locomotive.

7 Claims, 5 Drawing Sheets

ALTITUDE EFFECT

VOLTAGE EFFECT

TYPICAL LINK VOLTAGE

OPTIMIZED LOCOMOTIVE TRACTION SYSTEM

RELATED APPLICATIONS

This application claims priority of U.S. Provisional Patent Application Ser. No. 60/590,557 filed Jul. 23, 2004, the contents of which are incorporated herein by reference in its entirety.

FIELD OF THE INVENTION

The present invention relates generally to a traction system for a locomotive and more particularly to a locomotive traction system for optimized for operation at higher altitudes.

BACKGROUND OF THE INVENTION

Locomotives that are used for heavy haul applications typically operate at higher altitudes and thus experience extreme environmental conditions, such as sub-freezing temperatures, low atmospheric pressure and higher than normal cosmic radiation exposure. This is because the higher the altitude of the locomotive, the higher the exposure to cosmic radiation, the lower the ambient temperature and the lower the atmospheric pressure. One disadvantage to operating at higher altitudes involves the increased exposure of the locomotive to cosmic radiation. AC locomotives typically use power semiconductors, such as Integrated Gate Bipolar Transistors (IGBT) or Gate Turn-Off (GTO) Thyristors, to control the power flow to the traction motors. Unfortunately however, these types of power semiconductor devices are adversely affected by cosmic radiation and this higher than normal cosmic radiation exposure tends to cause these power semiconductor devices to fail at a higher rate. Although the failure rate depends upon various other factors as well, such as voltage stress and temperature, exposure to cosmic radiation is a large contributing factor to power flow device failure as shown in FIG. 1 which shows an example curve illustrating the failure rate of the semiconductor devices as a function of altitude. For example, locomotives operating at altitudes of 5000 meters will have a significantly higher failure rate (approximately 25 times) than that of locomotives operating at sea level.

Another disadvantage to operating at higher altitudes involves the lower than normal air density (as compared to the air density at sea level). This is because at higher altitudes the air density decreases, therefore at high altitudes a higher volume of air is required to deliver the same mass flow rate of air to cool the traction motors and/or other equipment as is required at sea level. Unfortunately however, in order to generate the required higher volume of air to achieve the required air mass flow, a larger (in both size and weight) than normal blower and associated ventilation system is required and acts to increase the total weight of the locomotive. This is undesirable because the total weight of the locomotive may be limited due to infrastructure considerations. For example, referring to FIG. 2, a prior art traction system 400 for a typical locomotive is shown and includes six (6) prior art traction motors 402 and two (2) prior art blowers 404, wherein one (1) of the prior art blowers 406 is associated with three (3) of the prior art traction motors 408 and the other of the prior art blowers 410 is associated with the remaining three (3) of the prior art traction motors 412.

Thus, this traction system 400 requires two (2) medium sized motor blowers 404 to cool the smaller sized traction motors 402, wherein these blowers 404 are relatively small and therefore can be operated at lower altitudes. Unfortunately however, operation at higher altitudes may stress the performance of these blowers and add to the failure rate of the semiconductor components. As such, if the locomotive is operated at lower altitudes the cosmic effects are much lower than at higher levels and the combined effects of the DC bus voltage and the cosmic radiation on the semiconductor electric power control component does not typically exceed any of the parameters of the semiconductor electric power control components and the failure rate of these components is low. However, if the locomotive is operated at higher levels the cosmic effects are much higher than at lower levels and the combined effects of the DC bus voltage and the cosmic radiation on the semiconductor electric power control component tends to approach and/or exceed the parameters of the semiconductor electric power control components resulting in a higher than normal component failure rate.

An additional problem of locomotive operation at higher altitude involves the low ambient air density and the associated weight increase of the blowers due to the additional work required to produce an adequate amount of airflow needed to cool the equipment, such as the traction motors. One way to address this problem may be to allow the traction motors to be operated at higher temperatures. Unfortunately, this is undesirable because these higher operating temperatures may add significantly to the failure rate and/or insulation costs. Thus, as the altitude decreases the power required to move the same volume of air increases. Blowers typically move the same volume of air at a given speed. Blowers used on locomotives run at a fixed speed (typically proportional to the engine speed). Therefore, the increased sized blowers that can produce the required air flow at high altitudes, generally cannot be operated at the same speed at lower altitudes (such as sea level) due to the stresses produced in the blower and the increased horsepower required by the blower motor.

SUMMARY OF THE INVENTION

A high-altitude railroad locomotive adapted for more reliable operation at high altitudes, wherein the high-altitude railroad locomotive includes a semiconductor electric power control component, and wherein due to the high altitude the locomotive would be exposed to high levels of cosmic radiation tending to damage the semiconductor electric power control component as compared to a low-altitude locomotive having a similar semiconductor electric power control component operating at a first DC bus voltage and including traction motors having a first active motor volume providing a predefined range of mechanical power sufficient to propel the locomotive is provided. The high-altitude locomotive includes electric power generation equipment, a plurality of traction motors mechanically connected to wheels supporting the high altitude locomotive and an electric power transmission system for transmitting electrical power from the electric power generation equipment to the plurality of traction motors. The electric power transmission system includes a DC bus electrically connected to the traction motors and a power controller for controlling the transmission of power over the DC bus, the traction motors having a second active motor volume, wherein the second active motor volume is larger than the first active motor volume to enable the DC bus voltage of the high-altitude locomotive to be reduced relative to the first DC bus voltage while generating a range of mechanical power corresponding to that of the low-altitude locomotive and sufficient to propel the locomotive at high altitudes, whereby the combined effects on the semiconductor electric power control component caused by the DC bus voltage of the high-altitude locomotive and by the cosmic radiation correspond to these effects on the semiconductor electric power control components of the low-altitude locomotive when operating at low altitudes to reduce the likelihood of failure of the semiconductor electric power control component of the high-altitude locomotive.

BRIEF DESCRIPTION OF THE FIGURES

The foregoing and other features and advantages of the present invention will be more fully understood from the following detailed description of illustrative embodiments, taken in conjunction with the accompanying drawings in which like elements are numbered alike in the several Figures.

DETAILED DESCRIPTION OF THE INVENTION

Figure 3:
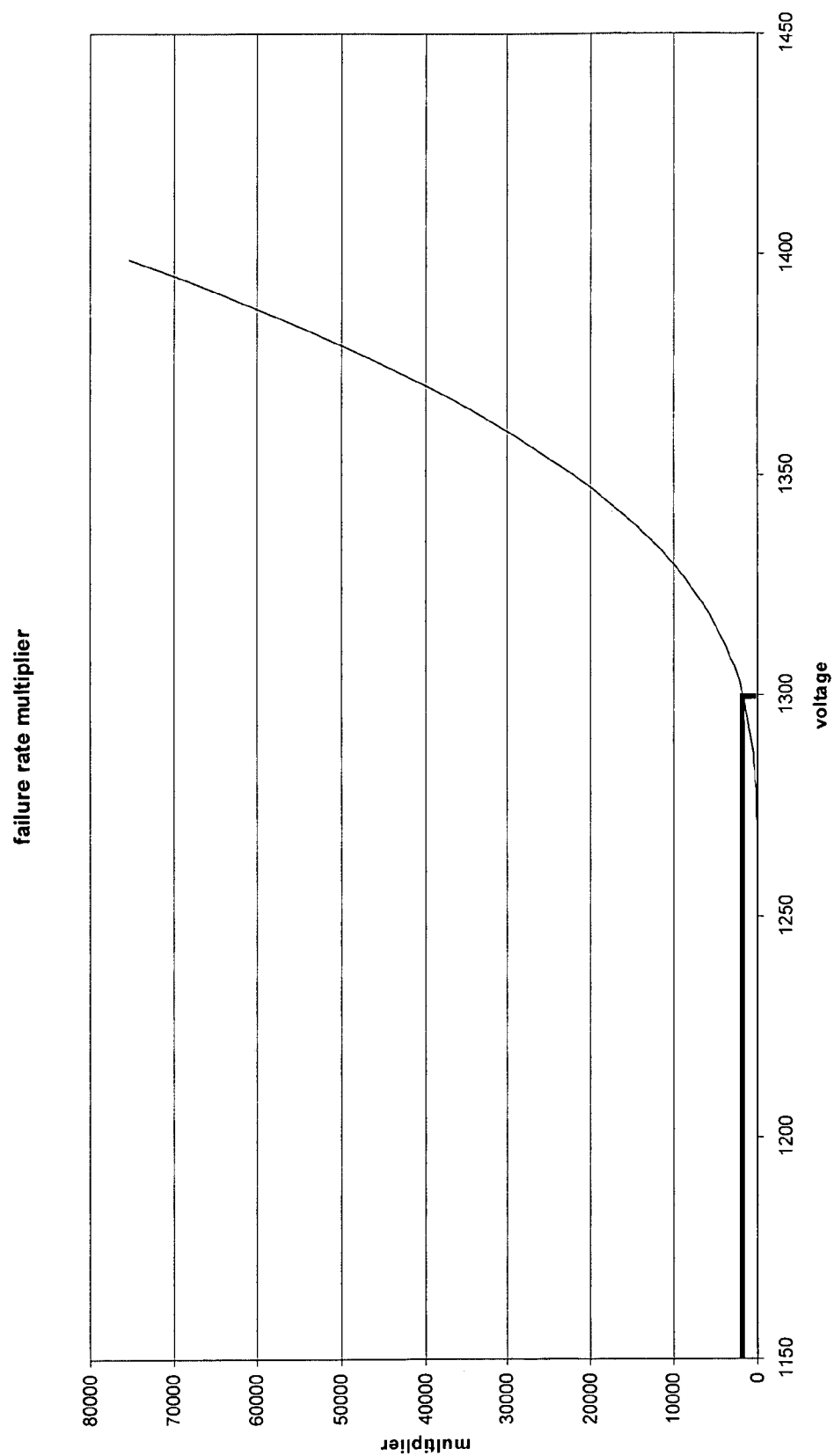
FIG. 3 is a graph illustrating the effect of voltage on a typical 2500 volt locomotive traction motor.

As discussed briefly above, locomotives that are used for heavy haul applications tend to experience extreme environmental conditions, such as low temperatures and high cosmic radiation levels due to higher altitude operation and as such, if a locomotive fails, it is possible that the crew and any passengers would be exposed to these elements. As such, because a failure of a locomotive may mean undue hardship to the locomotive crew and passengers, and can cause delay to other trains/locomotives using the same track, it is essential that these locomotives be as reliable as possible. Upon inspection, it can be seen that the failure rate of a traction system is related to the altitude at which the locomotive is operating and the voltage stress on the power semiconductor devices used to control the power to the traction motors. Referring to FIG. 3, a graph demonstrating the effect of voltage on the failure multiplier for a typical 2500 volt device is shown, wherein these devices are typically operated at approximately 1400 volts during maximum power operation. It can be seen from FIG. 3 that if the typical 2500 volt device is operated at voltages below 1300 volts the failure rate multiplier will be significantly reduced and may even compensate for the failure rate increases due to the higher altitude. Thus, a reduction in the voltage stress translates into a reduction of the failure rate for the semiconductor devices.

Figure 4:
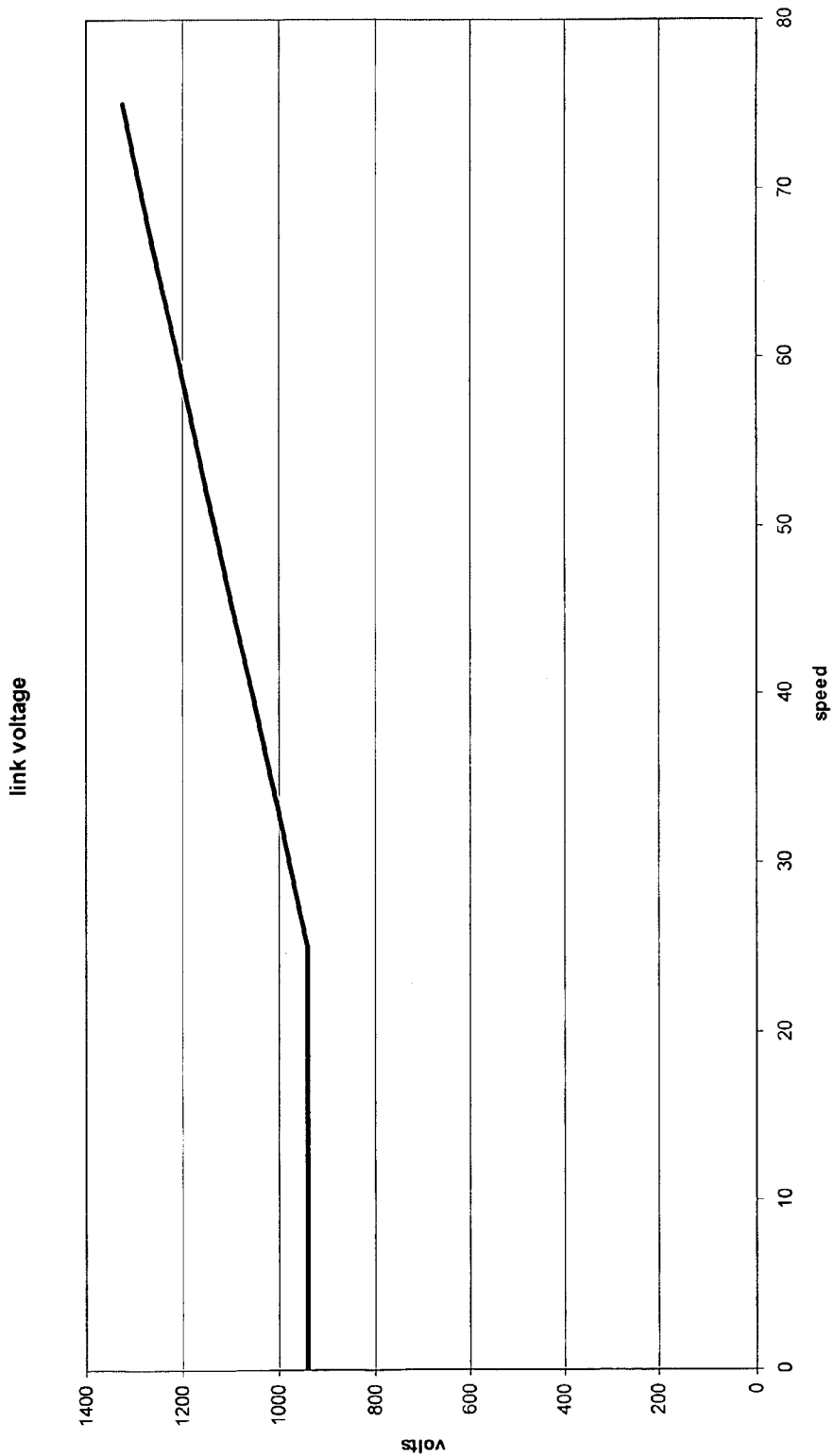
FIG. 4 is a graph illustrating the DC link voltage required by a traction motor to produce power and tractive effort as a function of speed.

Additionally, referring to FIG. 4, the DC link voltage required to produce power and tractive effort as a function of speed is illustrated for prior art systems operated at sea level. As shown, at lower speeds (below approximately 25 mph) the DC link voltage is determined by the losses in the semiconductor devices. While, at higher speeds (above approximately 25 mph) the voltage is increased such that the traction motor has a sufficient amount of flux to produce the required tractive effort/horse power. As such, as the speed increases, the failure rate, due to increased voltage stress, will increase as well.

In order to counter this, the traction motor has been redesigned with an increased capability to produce the same amount of power as current traction motors designs, but at a lower voltage. Not only does this assist in reducing the voltage stress, but it allows the semiconductor devices to be operated at lower voltages to compensate for the increase in altitude. It should be appreciated that there are various methods that may accomplish this result, including but not limited to, changing the number of turns, increasing the diameter of the traction motor, increasing the length of the traction motor, running the traction motors and/or equipment at a higher temperature and/or increasing the cooling capability of the blowers.

Figure 1:
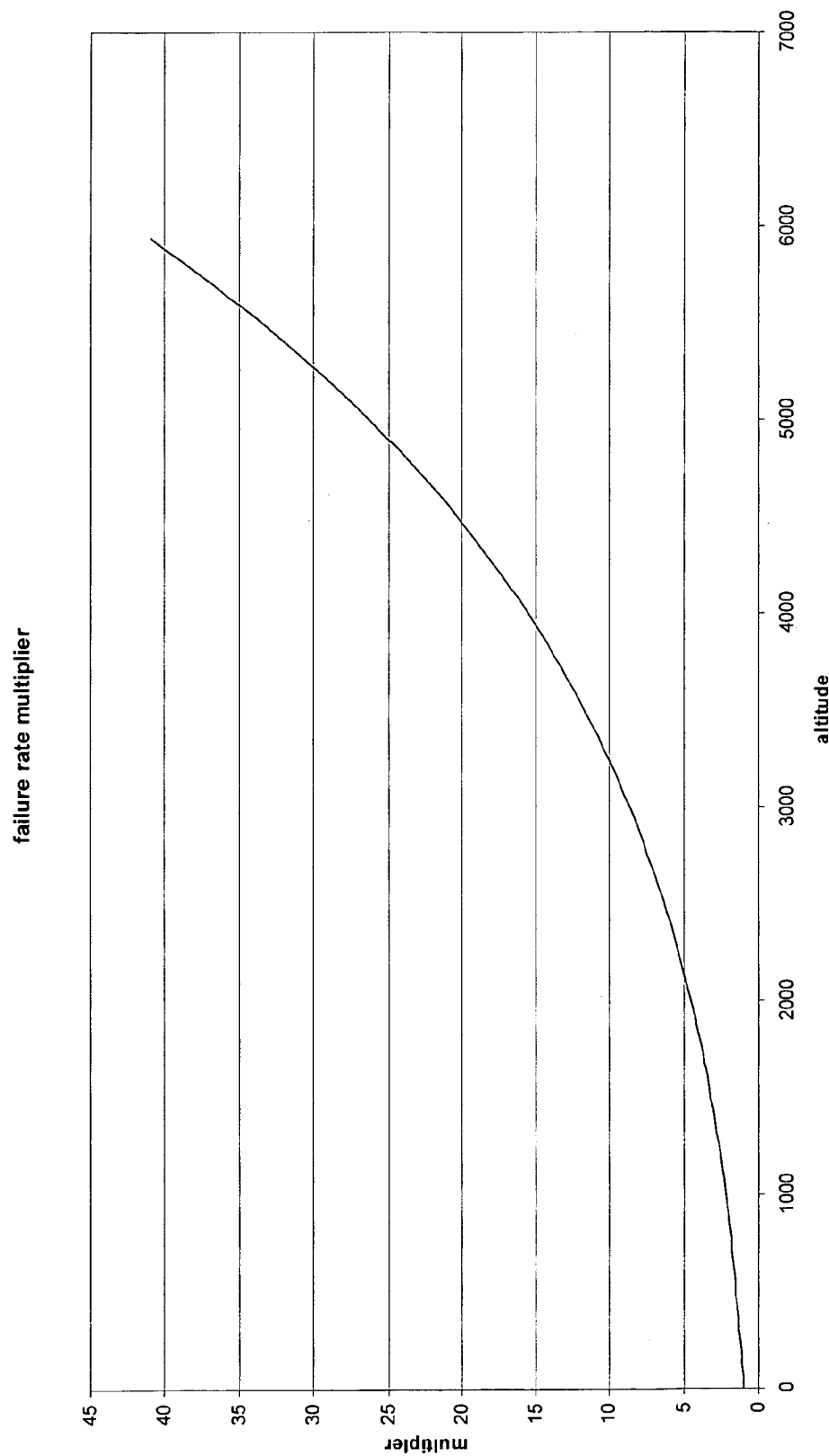
FIG. 1 is a graph illustrating the failure rate of semiconductor power components in a locomotive as a function of altitude.
Figure 2:
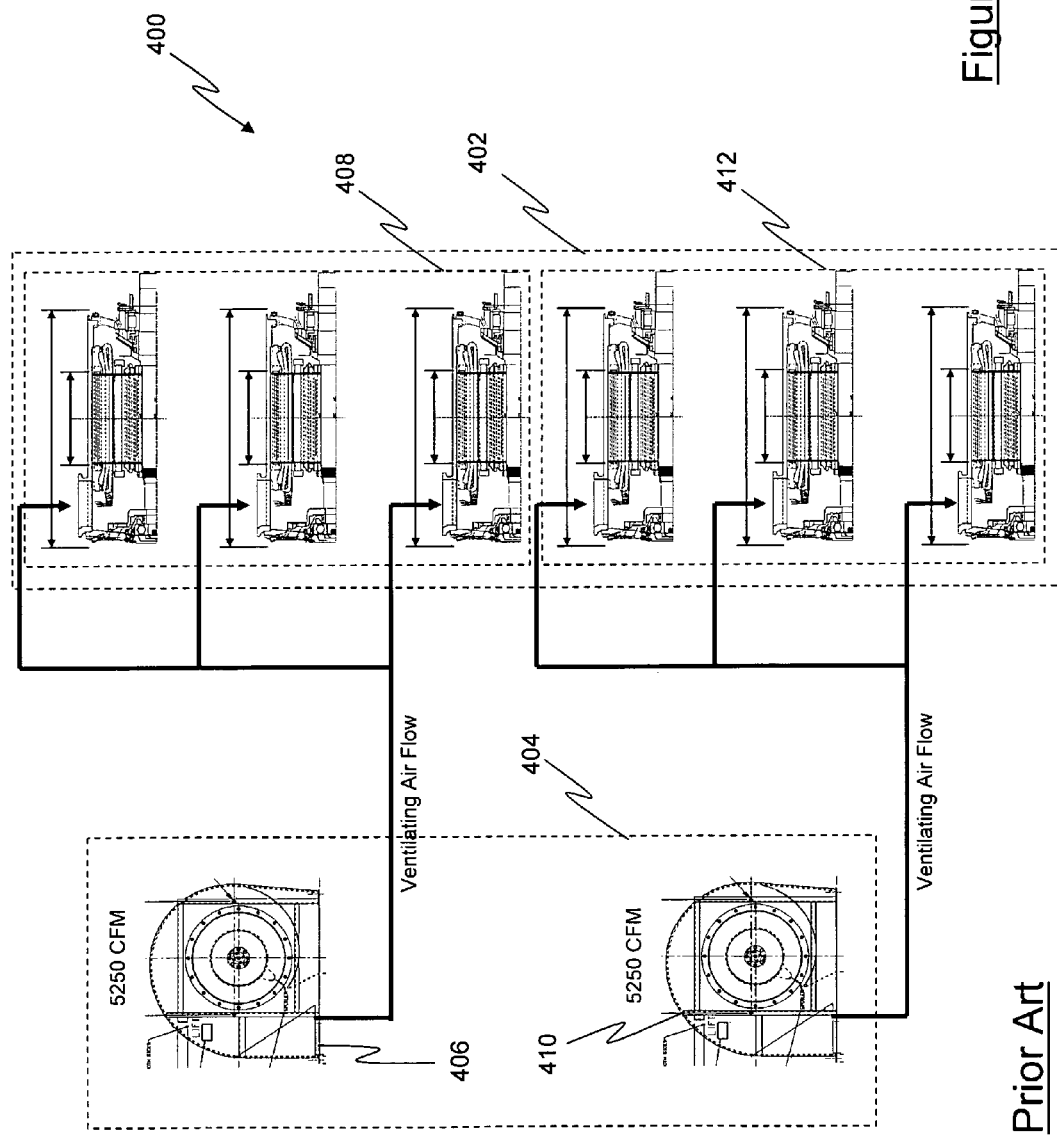
FIG. 2 is an illustration of a locomotive traction system, in accordance with the prior art.
Figure 5:
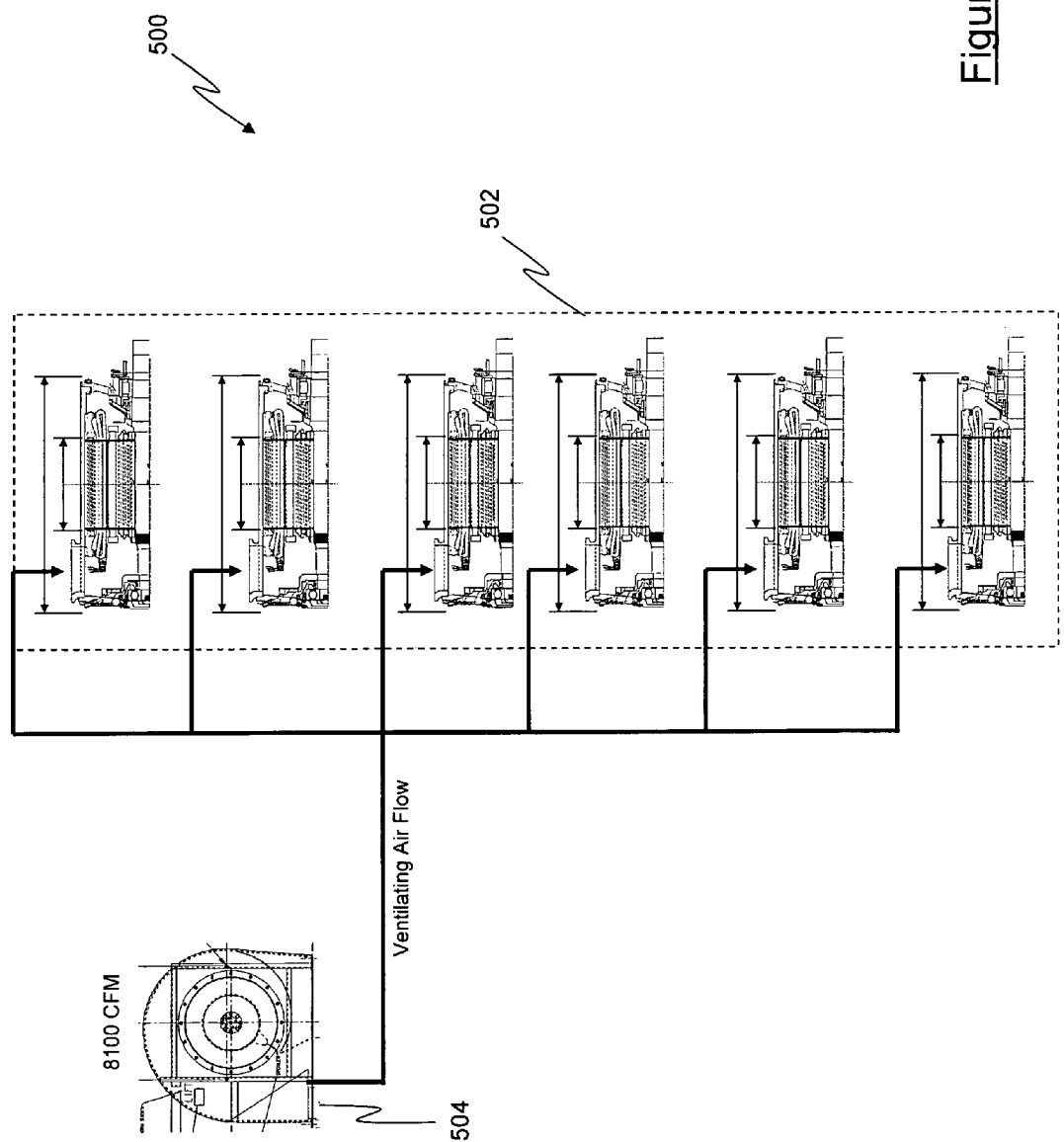
FIG. 5 is an illustration of a locomotive traction system, in accordance with an exemplary embodiment.

Referring to FIG. 5, one embodiment of a traction system 500 is shown and includes a plurality of traction motors 502 and one blower 504. This was accomplished by increasing the winding length of the traction motors 502 to provide a more efficient motor operation and increasing the size of the housing of the traction motors 502 to provide more cooling surface to sink the heat generated during operation of the locomotive, thus reducing the cooling air flow requirements of the traction motors 502. Thus, although the overall length of the traction motors have remained the same, the weight of the traction motors have been increased and the size and weight of the blower has been decreased. Simply put, increasing the size of the motor allows the motor to be operated at lower power to accomplish the same amount of work. Because the motor is larger and operates at lower power, the operating temperature of the motor is decreased and a larger amount of heat is bled off of the larger surface area, allowing for the use of a smaller blower. For example, comparing the prior art traction system 400 of FIG. 4 with the embodiment of traction system 500 of FIG. 5, although the size of the traction motors 402 and the blowers 404 have increased to that in FIG. 5, the total weight of the traction system 500 of FIG. 5 is less than the total weight of the prior art traction system 400 of FIG. 2. This allows the traction system 500 of FIG. 5 to be operated at both lower altitudes and higher altitudes without the combined effects of the DC bus voltage and the cosmic radiation on the semiconductor electric power control component exceeding the operating parameters of the semiconductor devices. Moreover, the reduction in blower size translated into a decrease in total system weight, thus satisfying the infrastructure weight consideration.

It should be further appreciated that although the active volume of the traction motor increased by approximately 10% in one configuration in order to achieve the desired voltage reduction, this translated into a reduction of approximately 10% in the associated air flow requirement. Additionally, although for the optimum weight system, the active volume of the traction motor may be increased by approximately 8% (overall 20% increase) in order to achieve the desired voltage reduction, translating into an associated overall air flow reduction of approximately 20%, any active volume increase may be used suitable to the desired end purpose. Overall, the higher capable motor with more copper windings, less losses and more area to produce cooling reduces the weight and failure rate. Since the smaller size blowers are running at much lower horse power and much lower stress than the blower is capable of at high altitudes, they can also run at their rated power at low altitudes. It should be appreciated that these devices may be operated at their rated power at higher and lower altitude without exceeding 1250 volts. Since the mass flow has increased at low attitudes the traction motor has much more capability than required. Therefore, the traction system can be operated at high and low altitudes.

While the invention has been described with reference to an exemplary embodiment, it will be understood by those skilled in the art that various changes, omissions and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. A high-altitude railroad locomotive adapted for more reliable operation at high altitudes, wherein the high-altitude railroad locomotive includes a semiconductor electric power control component, and wherein due to the high altitude the locomotive would be exposed to high levels of cosmic radiation tending to damage the semiconductor electric power control component as compared to a low-altitude locomotive having a similar semiconductor electric power control component operating at a first DC bus voltage and including traction motors having a first active motor volume providing a predefined range of mechanical power sufficient to propel the locomotive, the high-altitude locomotive comprising:

electric power generation equipment;
   a plurality of traction motors mechanically connected to wheels supporting the high altitude locomotive; and
   an electric power transmission system for transmitting electrical power from said electric power generation equipment to said plurality of traction motors, said electric power transmission system comprising a DC bus electrically connected to said traction motors and a power controller for controlling the transmission of power over said DC bus, said traction motors having a second active motor volume, wherein said second active motor volume is larger than the first active motor volume to enable the DC bus voltage of the high-altitude locomotive to be reduced relative to the first DC bus voltage while generating a range of mechanical power corresponding to that of the low-altitude locomotive and sufficient to propel the locomotive at high altitudes, whereby the combined effects on the semiconductor electric power control component caused by the DC bus voltage of the high-altitude locomotive and by the cosmic radiation correspond to these effects on the semiconductor electric power control components of the low-altitude locomotive when operating at low altitudes to reduce the likelihood of failure of the semiconductor electric power control component of the high-altitude locomotive.

2. The high altitude locomotive of claim 1, wherein said plurality of traction motors includes six traction motors.

3. The high altitude locomotive of claim 1, wherein said second active motor volume is 10% larger than said first active motor volume.

4. The high altitude locomotive of claim 1, further comprising at least one ventilation device, wherein said at least one ventilation device is selected to generate a ventilation air flow having a predetermined flow rate.

5. The high altitude locomotive of claim 4, wherein the locomotive further includes a gross vehicle weight and wherein the combination of said at least one ventilation device and said plurality of traction motors are chosen to minimize said gross vehicle weight.

6. The high altitude locomotive of claim 1, wherein said DC bus voltage is operated at a maximum voltage of 1250 volts.

7. The high altitude locomotive of claim 1, wherein the semiconductor electric power control component includes an operational voltage parameter range and wherein said plurality of traction motors are selected such that the cumulative effect of the power flow to said plurality of traction motors and said exposure to cosmic radiation falls within said operational voltage parameter range.

* * * * *